(12) United States Patent
Wellenhofer et al.

(10) Patent No.: US 11,065,592 B2
(45) Date of Patent: Jul. 20, 2021

(54) METHOD AND SYSTEM FOR FORMING AND FOR CATALYTICALLY REACTING A REACTANT MIXTURE—EMBODIMENT OF THE REACTOR

(71) Applicant: LINDE AKTIENGESELLSCHAFT, Munich (DE)

(72) Inventors: Anton Wellenhofer, Hohenschäftlarn (DE); Mathieu Zellhuber, Planegg (DE); Martin Schubert, Munich (DE); Robert Birk, Apfeltrach (DE); Celine Pichler, Saint-Louis (FR); Helmut Fritz, Munich (DE)

(73) Assignee: LINDE AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 16/759,116

(22) PCT Filed: Oct. 25, 2018

(86) PCT No.: PCT/EP2018/079352
§ 371 (c)(1),
(2) Date: Apr. 24, 2020

(87) PCT Pub. No.: WO2019/081682
PCT Pub. Date: May 2, 2019

(65) Prior Publication Data
US 2020/0338515 A1    Oct. 29, 2020

(30) Foreign Application Priority Data
Oct. 25, 2017   (EP) ..................... 17198318

(51) Int. Cl.
*B01J 4/00*     (2006.01)
*B01J 8/00*     (2006.01)
(Continued)

(52) U.S. Cl.
CPC ............... *B01J 8/065* (2013.01); *B01J 4/002* (2013.01); *B01J 19/0066* (2013.01);
(Continued)

(58) Field of Classification Search
CPC ..... B01J 4/00; B01J 4/001; B01J 4/002; B01J 8/00; B01J 8/02; B01J 8/06; B01J 8/065;
(Continued)

(56) References Cited

U.S. PATENT DOCUMENTS 3,518,284 A    6/1970  Foster
7,521,029 B2   4/2009  Guetlhuber

FOREIGN PATENT DOCUMENTS

DE    19955892 A1    6/2001
EP     1292382 B1    3/2003
(Continued)

OTHER PUBLICATIONS

PCT/EP2018/079352 English translation of International Search Report dated Jan. 2, 2019, 2 pages.
(Continued)

*Primary Examiner* — Natasha E Young
(74) *Attorney, Agent, or Firm* — Lathrop GPM LLP

(57) ABSTRACT

In a process as disclosed according to the present invention, gases or gas mixtures used to form a reactant mixture in an at least temporarily ignitable composition are fed into a mixing chamber (11) through the passages (131) in a boundary wall (13) of the mixing chamber (11) and by means of one or more feed conduits (14) which have feed orifices (141) and extend into the mixing chamber (11), respectively. The present invention likewise provides a corresponding reactor (1).

18 Claims, 1 Drawing Sheet

(51) Int. Cl.
- *B01J 8/02* (2006.01)
- *B01J 8/06* (2006.01)
- *B01J 19/00* (2006.01)
- *B01J 19/24* (2006.01)
- *B01J 19/30* (2006.01)

(52) U.S. Cl.
CPC ........... *B01J 19/248* (2013.01); *B01J 19/305* (2013.01); *B01J 2204/002* (2013.01); *B01J 2208/00849* (2013.01); *B01J 2208/00902* (2013.01); *B01J 2219/00594* (2013.01); *B01J 2219/025* (2013.01); *B01J 2219/2419* (2013.01); *B01J 2219/2422* (2013.01)

(58) Field of Classification Search
CPC .... B01J 19/00; B01J 19/0053; B01J 19/0066; B01J 19/24; B01J 19/248; B01J 19/30; B01J 19/305; B01J 2204/00; B01J 2204/002; B01J 2208/00; B01J 2208/00796; B01J 2208/00823; B01J 2208/00831; B01J 2208/00849; B01J 2208/00893; B01J 2208/00902; B01J 2208/00911; B01J 2208/0092; B01J 2219/00; B01J 2219/00274; B01J 2219/00583; B01J 2219/00594; B01J 2219/02; B01J 2219/025; B01J 2219/24; B01J 2219/2401; B01J 2219/2402; B01J 2219/2418; B01J 2219/2419; B01J 2219/2422

See application file for complete search history.

(56) References Cited

FOREIGN PATENT DOCUMENTS

WO  WO 2007045457 A1  4/2007
WO  WO-2017144584 A1 * 8/2017  ................ B01J 8/04

OTHER PUBLICATIONS

PCT/EP2018/079352 English translation of International Preliminary Report on Patentability dated Jan. 10, 2020, 7 pages.

* cited by examiner

METHOD AND SYSTEM FOR FORMING AND FOR CATALYTICALLY REACTING A REACTANT MIXTURE—EMBODIMENT OF THE REACTOR

This application is a national stage application claiming priority to International Patent Application No. PCT/EP2018/079352, now WO2019/081682, filed on Oct. 25, 2018, which claims priority to European Patent Application No. EP17198318.2, filed on Oct. 25, 2017.

The present invention relates to a process and to a plant for formation and for catalytic conversion of a reactant mixture according to the respective preambles of the independent claims.

PRIOR ART

In a number of chemical processes, reactant mixtures are converted catalytically. These reactant mixtures may be in the form of ignitable gas mixtures and are in that case sent to the catalytic conversion below their self-ignition temperature. An "ignitable gas mixture" is understood hereinafter to mean a gas mixture comprising one or more oxidizable components, especially one or more hydrocarbons, and oxygen. The oxygen may be added, for example, in the form of air or pure oxygen. An ignitable gas mixture has a composition that enables ignition of the gas mixture by means of an ignition source. As also elucidated hereinafter, in corresponding processes, it is also possible for there to be gas mixtures that are ignitable only temporarily, for example in a startup operation, in the event of process deviations and the like. Such an ignitable gas mixture formed only temporarily can also be supplied as reactant mixture to the catalytic conversion.

The present invention is described, inter alia, using the example of the oxidative dehydrogenation (ODH) of alkanes having two to four carbon atoms, in which the alkanes are supplied together with oxygen as reactant mixture to a catalytic reaction zone of a reactor. A corresponding reactant mixture may in principle be ignitable. More particularly, the invention can be used in the ODH of ethane (called ODH-E), but in principle also in the ODH of higher alkanes such as propane and butane. However, the invention is also usable and advantageous for other processes in which gaseous reactant mixtures are catalytically converted, for example in other oxidation processes such as the synthesis of ethylene oxide or acrylic acid.

ODH may be advantageous compared to more established processes for preparation of alkenes, such as steamcracking or catalytic dehydrogenation. For instance, there is no thermodynamic equilibrium limitation here on account of the exothermicity of the reactions involved. In principle, no regeneration of the catalysts used is necessary since the presence of oxygen enables an in situ regeneration. Finally, compared to steamcracking, smaller amounts of worthless by-products such as coke are formed.

For further details relating to ODH, reference is made to relevant technical literature, for example Ivars, F. and López Nieto, J. M., Light Alkanes Oxidation: Targets Reached and Current Challenges, in: Duprez, D. and Cavani, F. (eds.), Handbook of Advanced Methods and Processes in Oxidation Catalysis: From Laboratory to Industry, London 2014: Imperial College Press, pages 767-834, or Gartner, C. A. et al., Oxidative Dehydrogenation of Ethane: Common Principles and Mechanistic Aspects, ChemCatChem, vol. 5, no. 11, 2013, pages 3196 to 3217.

In ODH and other processes in which ignitable gas mixtures can be formed at least temporarily, in the presence of an ignition source upstream of or in the catalytic reaction zone of a reactor, there can be unwanted ignition. The subsequent largely uncontrolled burnoff can proceed in the manner of a deflagration or detonation.

An explosion is an uncontrolled burnoff of an ignitable gas mixture with a laminar flame front. In a deflagration, there is a turbulent flame front. Explosions and deflagrations on the one hand and detonations on the other hand differ essentially by the rate of propagation. In an explosion or deflagration said rate is below the speed of sound, and in a detonation said rate is typically markedly above the speed of sound. After a certain run-up distance and a minimum concentration of fuel and oxygen, an explosion or deflagration can become a detonation. Explosions, deflagrations and detonations of gas mixtures result in a massive pressure increase which can result in bursting of the plant components used and corresponding secondary damage.

In the case of an explosion or deflagration of a stoichiometric mixture of alkanes, alkenes and air there may be an increase in pressure by a factor of 10, and in the case of an explosion or deflagration of a stoichiometric mixture of alkanes, alkenes and oxygen an increase in pressure by a factor of 20. In the case of a detonation, far higher rises in pressure again are brought about.

Where an explosion is being discussed hereinafter, the corresponding elucidations also extend to a deflagration. Correspondingly, "explosion-resistant" arrangements or anti-explosion measures also give protection from deflagrations.

It is possible to fundamentally avoid corresponding mixed states, i.e. the formation of ignitable gas mixtures, and in this context to take measures that enable reliable prevention of the formation of ignitable gas mixtures even in the course of startup and shutdown and in the event of process deviations. In addition, it is possible to operate corresponding processes at low pressure and to execute the plants used in an explosion-resistant and possibly even detonation-resistant manner. In this connection, it is alternatively or additionally possible to use safety-directed measures or means of dissipation, for example bursting discs or anti-explosion flaps.

In principle, however, with regard to the conversion characteristics, the product spectrum and the selectivity and/or in view of downstream product processing, the catalytic conversion of an ignitable gas mixture as reactant mixture may be desirable or obligatory. In such cases, therefore, the avoidance of the formation of ignitable gas mixtures is not possible or at least disadvantageous for the reasons mentioned. The explosion- or detonation-resistant design of plants or the provision of corresponding measures or means of dissipation leads to additional costs.

The problem addressed by the invention is that of specifying measures that enable reliable enablement of the formation and optionally catalytic conversion of corresponding gas mixtures that may at least temporarily be in an ignitable state without unwanted ignition and subsequent explosion/deflagration or detonation.

DISCLOSURE OF THE INVENTION

Against this background, the present invention proposes a process and a reactor for catalytic conversion of a gaseous reactant mixture and a corresponding plant having the features of the independent claims. Configurations are in each case the subject of the dependent claims and of the description which follows.

The present invention proceeds from a process for forming and for catalytically converting a gaseous reactant mixture in which at least one first gas or gas mixture and a second gas or gas mixture are mixed to give the reactant mixture. For catalytic conversion of the reactant mixture, it is supplied to a reaction zone of a reactor.

Examples of catalytic conversions have already been elucidated above. As mentioned, the process according to the invention is especially suitable for use in ODH(-E) reactors or corresponding processes in which a reaction zone of a reactor is supplied with a gas mixture comprising alkanes and oxygen as reactant mixture. As mentioned, the present invention, however, can also be used, for example, in the aforementioned other processes or in all processes in which gaseous reactant mixtures are to be catalytically converted and ignitability cannot or is not to be ruled out from the outset.

In principle, the reaction zone, in the context of the present invention, may be equipped with any desired catalysts, especially in immobilized form. For example, in the context of the present invention, fixed bed catalysts, honeycombs or catalytically active bodies in the form of externally heated and/or cooled tubes may be used. In the case of a tubular reactor, for example, a number of reaction tubes have been filled with catalyst. These are guided through a reactor chamber and heated or cooled therein. By means of suitable distributor units, the ignitable gas mixture is distributed between the individual reaction tubes, as also elucidated hereinafter.

If it is said here that a gaseous reactant mixture is formed and catalytically converted or this gas mixture is fed to a reaction zone of a reactor, this is not necessarily understood to mean, as already elucidated at the outset, that an ignitable gas mixture as the reactant mixture must constantly be formed and converted throughout the process. More particularly, in the context of the present invention, there may also be formation of ignitable gas mixtures only at particular times, i.e., for example, in startup operation of a corresponding reactor or on switching between different modes of operation or in the event of operational deviations. In regular operation, by contrast, the reaction zone may also be supplied, for example, with a non-ignitable gas mixture as reactant mixture. Conversely, a non-ignitable mixture can also be run merely close to or at the selected operating point, while non-ignitable conditions are chosen on startup or when operating conditions are changed, for example by elevated dilution with inert gases.

The ignitability of a corresponding gas mixture is determined by its composition, especially its content of oxidizable compounds and oxygen. More particularly, a corresponding ignitable gas mixture contains hydrocarbons such as alkanes in the case of ODH. As well as the first and second gas mixtures, it is also possible in the context of the present invention to use and mix further gas mixtures.

More particularly, in the context of the present invention, the first gas or gas mixture may contain one or more oxidizable compounds, especially alkanes or alkenes. The second gas or gas mixture may especially contain oxygen. In principle, it is also possible that the first gas or gas mixture contains the oxygen and the second gas or gas mixture contains the one or more oxidizable compounds. The gas or gas mixture containing the oxygen in each case may be pure oxygen, air or oxygen-enriched air or mixtures thereof. In general, both gases, irrespective of the oxygen source, may contain further diluents that are inert or of low reactivity, for instance water vapour, nitrogen, methane, carbon dioxide or further components. The term "inert" relates to the reaction characteristics of corresponding compounds in a corresponding reaction system and is not limited to compounds that are conventionally referred to as "inert", for example the inert gases nitrogen, helium or argon.

In principle, it is also possible in the context of the present invention to provide the first gas and/or gas mixture and/or the second gas or gas mixture already in the form of a gas or gas mixture that contains one or more oxidizable compounds and simultaneously oxygen. In this way, it is optionally possible to improve miscibility of the first and the second gas or gas mixture. Even when, for example, the first or the second gas mixture is provided entirely or partly as a recycle stream, this may also contain oxygen as well as one or more oxidizable compounds. By contrast with the reactant mixture formed using the first gas or gas mixture and the second gas or gas mixture, in such a first or second gas mixture, however, it is optionally possible to ensure non-ignitability at any time.

What is then envisaged in the context of the present invention is that the first gas or gas mixture and the second gas or gas mixture are fed into a mixing chamber having a boundary wall provided with a number of passages, where the first gas mixture is fed into the mixing chamber through the passages in the boundary wall and where the second gas or gas mixture is fed into the mixing chamber by means of one or more feed conduits which have feed orifices and extend into the mixing chamber.

In the context of the present invention, the first gas or gas mixture is fed into the mixing chamber through the passages in the boundary wall in a flow state or flow regime which is critical (from the point of view of flow mechanics). A critical flow state or flow regime exists when the first gas or gas mixture exits from the passages in the boundary wall and enters the mixing chamber at the speed of sound in the first gas or gas mixture, i.e. when the Mach number Ma is equal to 1. With regard to the term "critical flow", reference is made to suitable expert literature, see e.g. Frenzel, B. and Gebhard, F., Physik Formelsammlung: Für Ingenieure and Naturwissenschaftler, page 78. The calculation of sound in an ideal gas is known and can be taken, for non-ideal gases, from expert literature.

A corresponding critical flow state may especially be established via a suitable choice of the number and diameter of passages in the boundary wall and the corresponding flow parameters of the first gas or gas mixture, especially the pressure thereof upstream of the boundary wall. Corresponding parameters can be ascertained directly by the person skilled in the art, for example on the basis of flow dynamics calculations or simulations.

If the first gas or gas mixture is fed into the mixing chamber in a critical flow state in this way, it is possible to reliably avoid backmixing from the mixing chamber into a region upstream of the mixing chamber or the boundary wall. An ignitable gas mixture can therefore not form in a corresponding upstream region or not spread into a corresponding upstream region. Such an upstream region must therefore not be formed when appropriate safety measures are observed, which enables less costly establishment of a corresponding reactor.

U.S. Pat. No. 7,521,029 B2 discloses a tubular reactor for performance of catalytic gas phase reactions, in which particular plant components that come into contact with a reactant mixture have an explosion-resistant design. Plant components of this kind have a very small volume, and so the apparatus complexity in the explosion-resistant design can be limited. More particularly, however, this publication does not disclose, as envisaged in the context of the present invention, provision of a mixing chamber with a boundary wall provided with passages and feeding of a gas mixture into the mixing chamber through passages in a corresponding boundary wall. More particularly, no feeding in a critical flow state is disclosed here either. By contrast with said U.S. Pat. No. 7,521,029 B2, in the context of the present invention, by contrast, the apparatus complexity can be distinctly reduced in that solely a corresponding boundary wall is introduced into the reactor.

In this way, the present invention enables reliable performance of catalytic reactions by forming a gas mixture, which may be ignitable, only immediately upstream of a reaction zone and limiting it to a particular region, namely the mixing chamber mentioned (and optionally the downstream reaction zone). In other words, in the context of the present invention, a mixing zone, i.e. the region in which the reactive component of a reactant stream is mixed with an oxidizer, up to the start of the reaction zone is minimized by technically simple and inexpensive measures to a size which is uncritical from a safety point of view. In this way, more particularly, the region in which a corresponding ignitable gas mixture is present, in a simple manner, for example, can be designed in an explosion- or detonation-resistant manner or provided with corresponding measures or means of dissipation without the entire reactor having to be configured correspondingly.

Firstly, aspects and embodiments of the process proposed in accordance with the invention are elucidated in detail hereinafter. Thereafter, in particular, the apparatus implementation of the process according to the invention is described with reference to a reactor and preferred embodiments thereof. It will be apparent that the elucidations relating in each case to the process according to the invention and its configurations apply equally to the reactor according to the invention and its configurations, and are not elucidated repeatedly here merely for avoidance of repetition. In principle, as elucidated, the first gas or gas mixture or the second gas or gas mixture may be the oxygen-containing gas mixture, and the respective other gas mixture may be the gas mixture comprising the one or more oxidizable components. Advantageously, that medium or gas or gas mixture with the constant and higher flow rate is guided through the boundary wall or its passages.

In a particularly preferred configuration of the process according to the invention, in addition, for feeding of the first gas or gas mixture into the mixing chamber in the critical flow state, the first gas or gas mixture is provided on a side of the boundary wall remote from the mixing chamber at a higher pressure than exists in the mixing chamber. In this way, additional safeguarding against backmixing into an upstream region is achieved. Overall, the measures according to the invention also achieve equal distribution of the first gas or gas mixture in the mixing chamber.

By suitable technical measures, as especially also elucidated hereinafter with reference to the apparatus configuration of the reactor envisaged in accordance with the invention and its embodiments, it is possible to achieve a corresponding critical flow state, especially also by a suitable selection of the passages that may especially take the form of nozzles. Advantages are achieved through the use of Venturi nozzles or nozzles having Venturi character. Particular advantages are also achieved through the use of Laval nozzles or nozzles having Laval character.

Particular advantages are achieved when the second gas or gas mixture is mixed with the first gas or gas mixture, for example by means of a tubular distributor, in the mixing chamber. The gaseous reactant mixture may be formed in a mixing region defined in this way. The second gas or gas mixture is advantageously fed in by feeding the second gas or gas mixture into the mixing chamber at a higher velocity than the laminar or turbulent flame velocity of the ignitable gas mixture and/or in a critical flow state. Flow velocities or flow characteristics of this kind and the nozzles, tubular distributors and the like that are required for the purpose are also ascertained by the person skilled in the art, for example, by flow simulations or calculations.

A reactor envisaged in accordance with the invention is set up to form and to catalytically convert a gaseous reactant mixture, wherein the reactor has a reaction zone and is set up to mix at least one first gas or gas mixture and one second gas or gas mixture to give the reactant mixture and feed it to the reaction zone. According to the invention, the reactor has a mixing chamber having a boundary wall having a number of passages, where means set up to feed the first gas or gas mixture into the mixing chamber through the passages in a critical flow state are provided. With regard to the means provided for establishment of a critical flow state, reference is made to the elucidations above and those which follow. In addition, for feeding of the second gas or gas mixture into the mixing chamber, one or more feed conduits which have feed orifices and extend into the mixing chamber are provided. With regard to the features and advantages of a corresponding reactor, reference is also made to the above elucidations relating to the process proposed in accordance with the invention.

In the simplest case, the passages through the boundary wall may be at least partly in the form of cylindrical holes. Such an execution is implementable in a particularly simple manner, but may require a high pressure differential between a region arranged upstream of the mixing chamber and the mixing chamber itself in order to assure the critical flow state of the first gas or gas mixture. Such a solution is therefore an option especially when a corresponding first gas or gas mixture is present at comparatively high pressure and is to be supplied to the reaction zone at comparatively low pressure.

In an alternative configuration of the present invention, the passages, by contrast, are at least partly in the form of nozzles, it being a particular feature of a nozzle that it has a cross section that changes along a nozzle axis. A corresponding nozzle may especially be in exchangeable form and may have been screwed into the boundary wall, for example, or fixed therein in some other way. Compared to a cylindrical hole, a nozzle enables a controlled influence on the flow. In this way, it is especially possible to ensure that, even in the case of a relatively small pressure differential between a region upstream of the mixing chamber and the mixing chamber itself, it is possible to provide a critical flow state.

In a particularly preferred embodiment of the present invention, corresponding nozzles at least partly take the form of nozzles having Venturi or Laval characteristics, i.e. of nozzles having a cross section that first constricts and then widens, with a constant transition from one part to the other. The cross section is advantageously circular or elliptical at every point. The use of nozzles having Venturi or Laval characteristics or Venturi or Laval nozzles reduces the pressure differential required between the upstream region and the mixing chamber to a particularly high degree, such that the pressure drop required for provision of a critical flow state is exceptionally small.

In a particularly preferred configuration of the present invention, the mixing chamber may be provided with a random packing which is especially in inert form, but may also already be catalytically active. In this way, the mass of the reactive gas in a corresponding mixing chamber is reduced and the inert mass is increased. By means of a corresponding random packing, energy can be withdrawn from an incipient explosion, such that the burnoff is extinguished. Thus, the design pressure required can be significantly reduced and the pressure shell can correspondingly be designed in a less costly manner.

Rather than an inert random packing, it is also possible to provide a structured packing and/or a static mixing element for the same purpose. It is also possible by means of the thermal mass of a structured packing or of a static mixing element to withdraw energy from an incipient explosion. The structured packing which may, for example, be formed from correspondingly structured metal sheets, or a static mixing element, may especially also be disposed only in part of the mixing chamber, especially solely downstream of the feed conduits for the second gas mixture or the openings thereof into the mixing chamber. By means of a structured packing or static mixing element, it is additionally possible to achieve improved mixing of the first and second gas mixtures in the mixing chamber or the corresponding region.

As already elucidated, the one or more feed conduits that extend into the mixing chamber and have the feed orifices for the second gas or gas mixture may advantageously take the form of tubular distributors. In this way, it is possible to achieve equal distribution of the second gas or gas mixture in the first gas or gas mixture or in the mixing chamber.

In the context of the present invention, a corresponding mixing chamber especially has a cylindrical interior, where one cross-sectional circular face of the cylindrical interior is formed by the boundary wall mentioned. This cylindrical interior especially does not narrow conically proceeding from the boundary wall in the direction of the reaction zone, or does not undergo any change in cross section, such that a corresponding reaction zone can be implemented in a technically simple manner in known reactors.

The other cross-sectional circular face of the cylindrical interior is especially formed by a further boundary wall having passages, where the further boundary wall delimits the reaction zone from the mixing chamber. The further boundary wall may especially be a tube plate from which reaction tubes filled with a catalyst extend. Both boundary walls may be provided in a technically simple and non-complex manner as discs that can be fitted into a cylindrical outer shell of a corresponding reactor.

The mixing chamber may especially be defined such that the two boundary walls mentioned are secured to one another, for example, by means of stud bolts, at a defined distance that sets the size of the mixing chamber. Corresponding stud bolts may especially be screwed to one of the boundary walls and be welded to the other. In this way, a corresponding reactor may be designed such that it can be entirely dismantled. In this way, the two boundary walls, in the case of a postulated explosion acting symmetrically and simultaneously on the boundary walls, can support one another such that it is possible to dispense with further support measures or to make their dimensions smaller.

Particularly advantageously, the mixing chamber used in the context of the present invention is in explosion-resistant form. Owing to the spatially significantly reduced mixing region, a corresponding explosion-resistant design can be effected in a particularly simple and inexpensive manner. Alternatively or additionally to an explosion-resistant design, it is possible to use measures or means of dissipation, for example, bursting discs or anti-explosion flaps.

More particularly, a region between the boundary walls mentioned, in the context of the present invention, can be reduced to less than one metre, especially less than half a metre.

Overall, the measures proposed in the context of the present invention can achieve reduction of a combustible gas mixture formed in a regular manner or in the event of process deviations to a very small volume. The effects of unwanted ignition are restricted to this small volume. By virtue of the restriction to the small volume, the maximum that can occur is an explosion; transformation to a detonation is prevented. The small volume in the form of the mixing chamber can be designed to be resistant to explosion pressure, such that operation is not significantly impaired by any explosion. The process according to the invention is also performable at higher system pressures and high reactant concentrations. By contrast with a solution proposed in EP 1292 382 B1, for example, in which jetting into individual reaction tubes is undertaken individually, the process according to the invention or a corresponding reactor can be executed or set up in a technically simple manner.

The invention is elucidated in detail hereinafter with reference to the appended drawings which illustrate preferred configurations of the present invention.

BRIEF DESCRIPTION OF THE DRAWINGS

In the figures, corresponding elements bear identical reference signs and, for the sake of clarity, are not elucidated repeatedly.

DETAILED DESCRIPTION OF THE DRAWINGS

Figure 1:
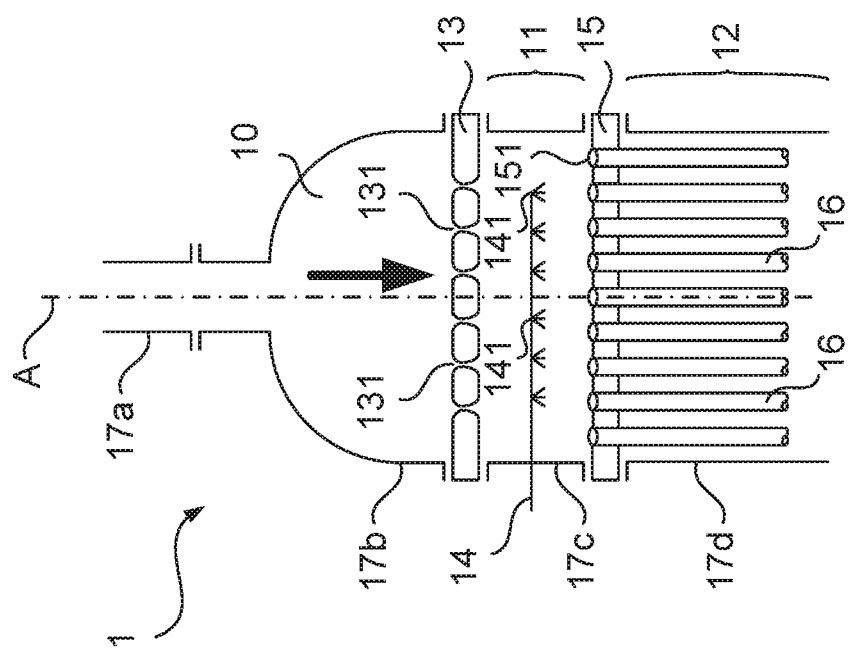
FIG. 1 illustrates a reactor in one embodiment of the invention in a highly simplified partial view.

FIG. 1 illustrates a reactor in one embodiment of the present invention in a highly simplified partial view, which is labelled 1 as a whole. The reactor 1 is shown in longitudinal section. The reactor 1 comprises a mixing chamber 11 and a reaction zone 12, each of which is cylindrical and has a centre axis A.

The mixing chamber 11 is delimited by means of a boundary wall 13 from an upstream region 10 from which a first gas or gas mixture, as illustrated here by means of an arrow, flows in the direction of the boundary wall. With regard to the nature of the first gas or gas mixture, reference is made explicitly to the above elucidations. The first gas or gas mixture flows through passages 131 which may especially take the form of nozzles, particularly advantageously of Laval nozzles or nozzles with Laval characteristics, into the mixing chamber 11. The tuning is effected in a critical flow state, as elucidated.

For feeding of a second gas or gas mixture, with regard to which reference is likewise made to the above elucidations, one or more feed conduits 14 with feed orifices 141 into the mixing chamber 11 are provided. As elucidated, the second gas or gas mixture can also be fed in in a critical flow state.

The mixing chamber 11 is also bounded by a further boundary wall 15 having passages 151, which in the example shown is a tube plate which may be adjoined by reaction tubes 16 which may especially have been filled with a suitable catalyst. The elements mentioned are also bounded by outer shell segments 17*a* to 17*d*, which define a cylindrical cross section of the reactor 1 about the centre axis A.

Figure 2:
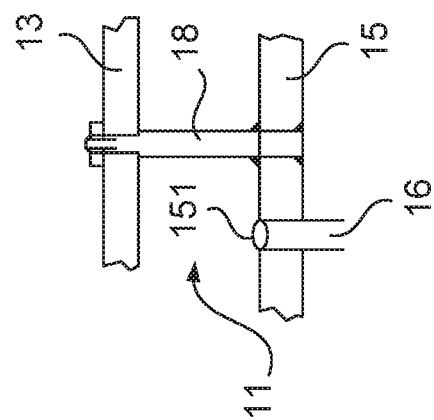
FIG. 2 illustrates boundary walls of a mixing chamber of a reactor in one embodiment of the invention in a highly simplified partial view.

FIG. 2 illustrates boundary walls 13, 15 of a reactor in one embodiment of the present invention in a highly simplified partial view. For further elucidation, reference is made to the remarks relating to FIG. 1. FIG. 2 especially illustrates how these boundary walls 13, 15 can be arranged at a defined distance from one another by means of stud bolts 18 which, in the example shown, have been welded to the boundary wall 15 and screwed to the boundary wall 13.

The invention claimed is:

1. Process for forming and for catalytically converting a gaseous reactant mixture in which a first gas or gas mixture and a second gas or gas mixture are mixed to give the reactant mixture and then supplied to a reaction zone (12) of a reactor (1), characterized in that the reactant mixture is at least temporarily formed as an ignitable gas mixture, and in that first gas or gas mixture and the second gas or gas mixture are fed into a mixing chamber (11) having a boundary wall (13) provided with a number of passages (131), where the first gas or gas mixture is fed into the mixing chamber (11) through the passages (131) in a critical flow state and the second gas or gas mixture is fed into the mixing chamber (11) by means of one or more feed conduits (14) which have feed orifices (141) and extend into the mixing chamber (11).

2. Process according to claim 1, in which the first gas or gas mixture is provided on a side of the boundary wall (13) facing away from the mixing chamber (11) with a higher pressure than exists in the mixing chamber (11).

3. Process according to claim 1, in which the second gas or gas mixture is fed into the mixing chamber (11) at a higher velocity than the laminar or turbulent flame velocity of the ignitable gas mixture and/or in a critical flow state.

4. Reactor (1) for formation and for catalytic conversion of a gaseous reactant mixture, wherein the reactor (1) has a reaction zone (12) and is set up to mix at least one first gas or gas mixture and one second gas or gas mixture to give the reactant mixture and supply it to the reaction zone (12), characterized in that the reactor (1) is set up to form the reactant mixture at least temporarily as an ignitable gas mixture, and in that the reactor (1) comprises a mixing chamber (11) having a boundary wall (13) provided with a number of passages (131), wherein the passages (131) are at least partially formed as nozzles having Venturi or Laval characteristics, wherein means set up to feed the first gas or gas mixture into the mixing chamber (11) through the passages (131) in a critical flow state are provided, and wherein one or more feed conduits (14) which have feed orifices (141) and extend into the mixing chamber (11) are provided for feeding of the second gas or gas mixture into the mixing chamber (11).

5. Process according to claim 1, wherein the passages (131) are at least partly in the form of cylindrical holes.

6. Process according to claim 1, wherein the passages (131) are at least partly in the form of nozzles.

7. Process according to claim 6, wherein the passages (131) in the form of nozzles at least partly have Venturi or Laval characteristics.

8. Process according to claim 6, wherein the passages (131) in the form of nozzles are at least partly exchangeable.

9. Process according to claim 1, in which in the reactor (1) used the mixing chamber (11) has been provided with a random packing and/or a structured packing having a static mixing effect and/or with another mixing unit.

10. Process according to claim 1, in which the one or more feed conduits (14) which has/have the feed orifices (141) and extend(s) into the mixing chamber (11) take(s) the form of tubular distributors.

11. Process according to claim 1, in which in the reactor (1) used the mixing chamber (11) has a cylindrical interior, where a cross-sectional circular face of the cylindrical interior is formed by the boundary wall (13).

12. Process according to claim 11, in which in the reactor (1) used the other cross-sectional circular face of the cylindrical interior is formed by a further boundary wall (15) having passages (151), where the further boundary wall (15) delimits the reaction zone (12) from the mixing chamber (11).

13. Process according to claim 12, in which in the reactor (1) used the boundary walls (13, 15) are secured to one another by means of stud bolts at a defined separation.

14. Process according to claim 1, in which in the reactor (1) used the mixing chamber (11) is in explosion-resistant form.

15. Reactor according to claim 4, wherein the passages (131) are at least partly in the form of cylindrical holes.

16. Reactor according to claim 4, wherein the passages (131) are at least partly in the form of nozzles.

17. Reactor according to claim 16, wherein the passages (131) in the form of nozzles at least partly have Venturi or Laval characteristics.

18. Reactor according to claim 16, wherein the passages (131) in the form of nozzles are at least partly exchangeable.

* * * * *